UNITED STATES PATENT OFFICE.

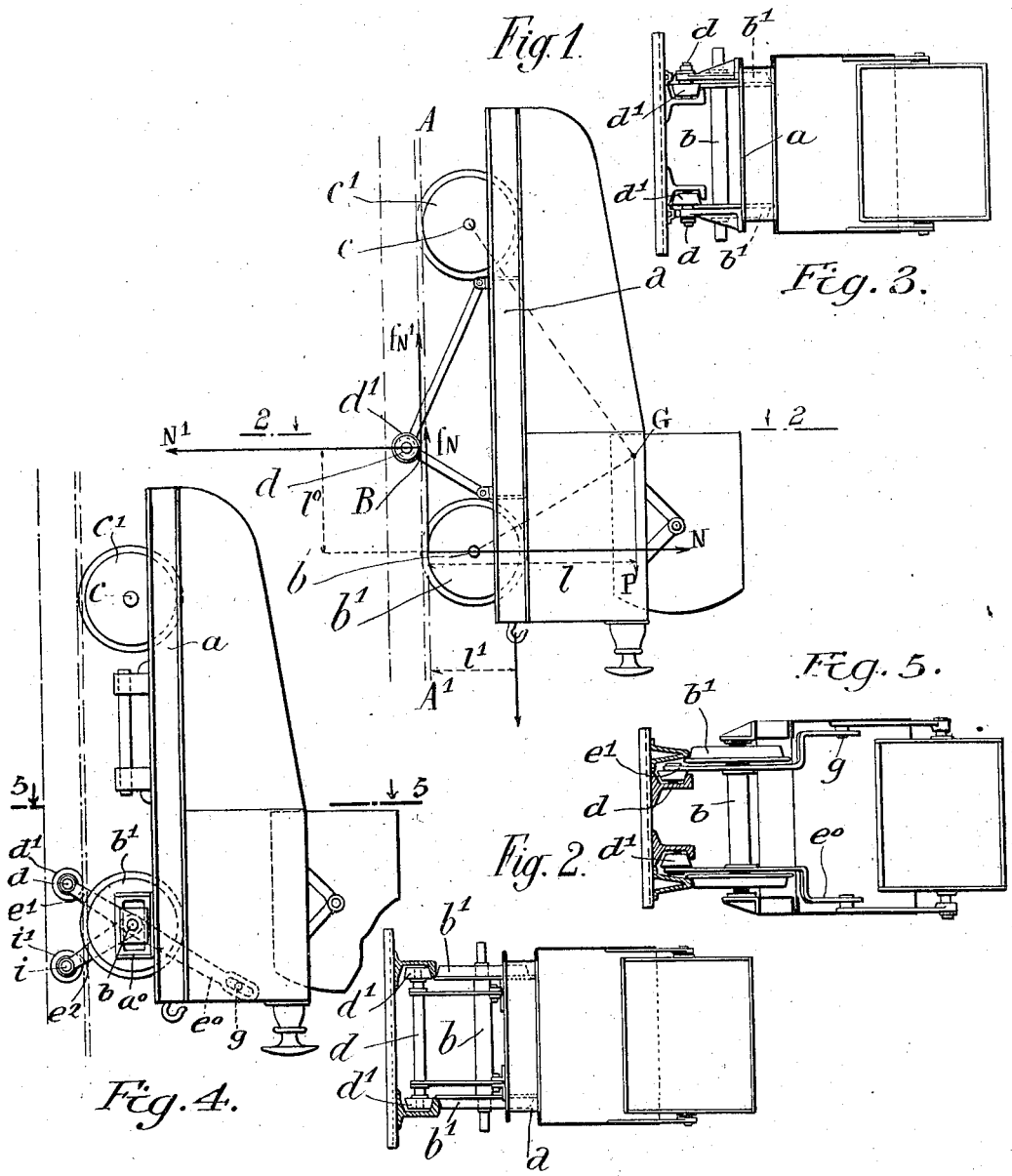

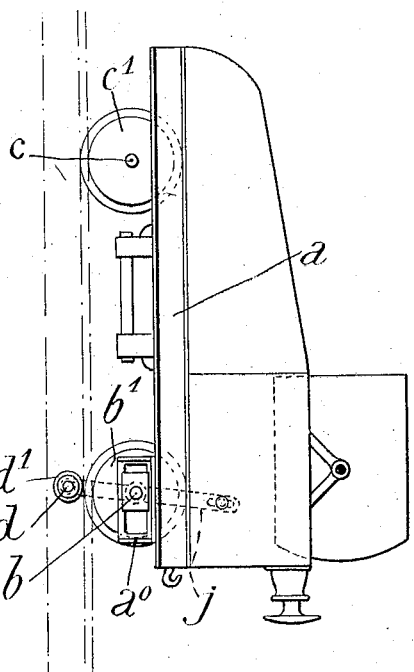
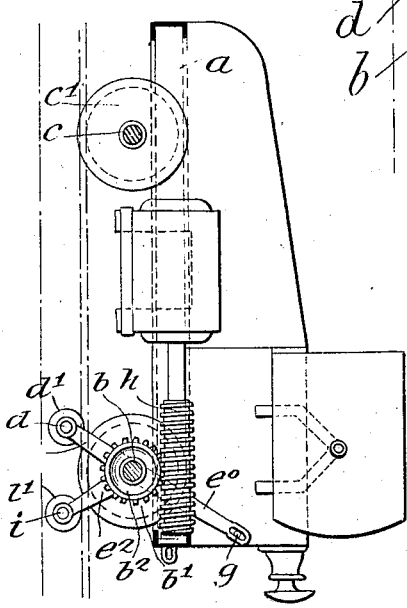
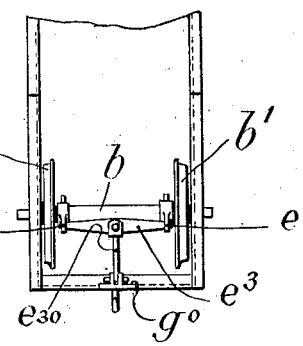

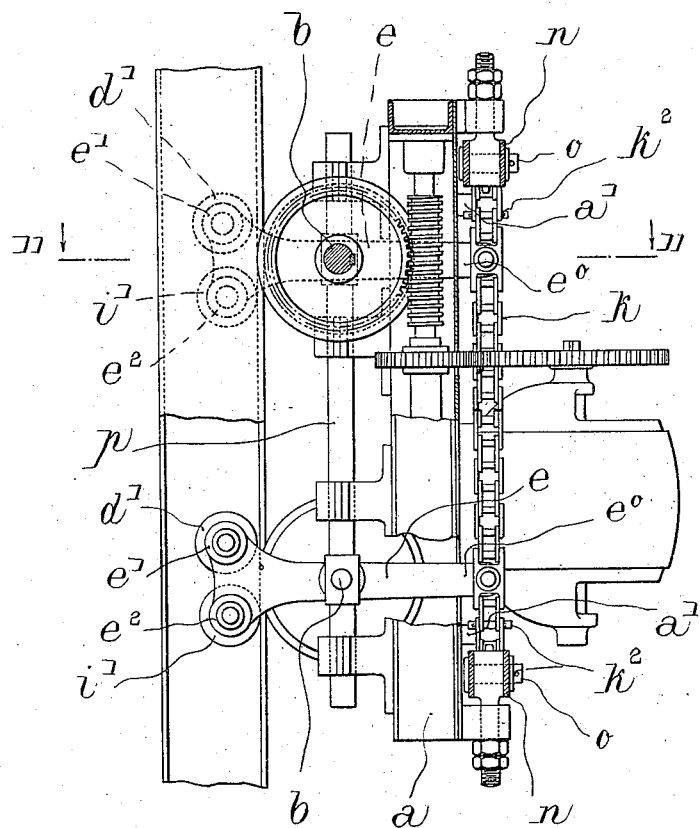

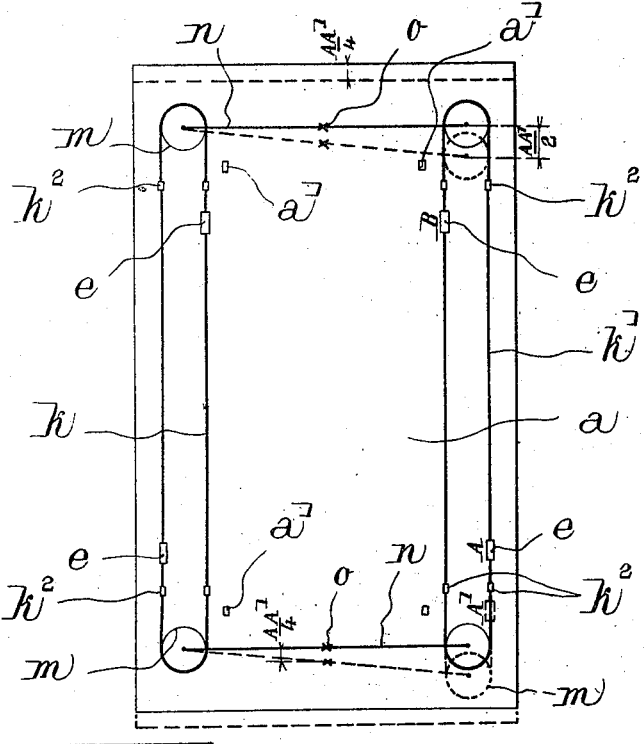
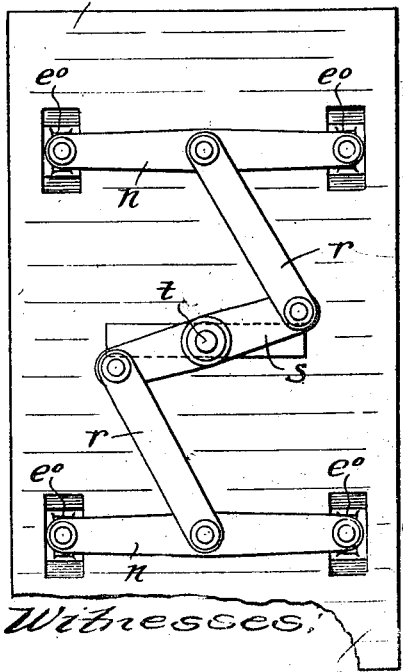
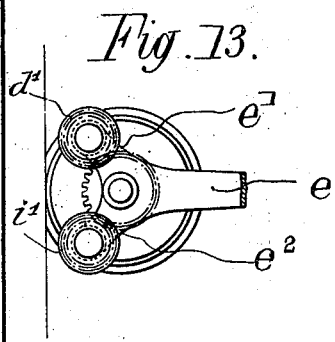
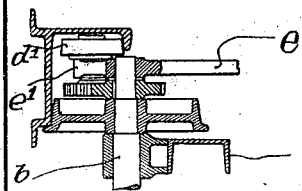

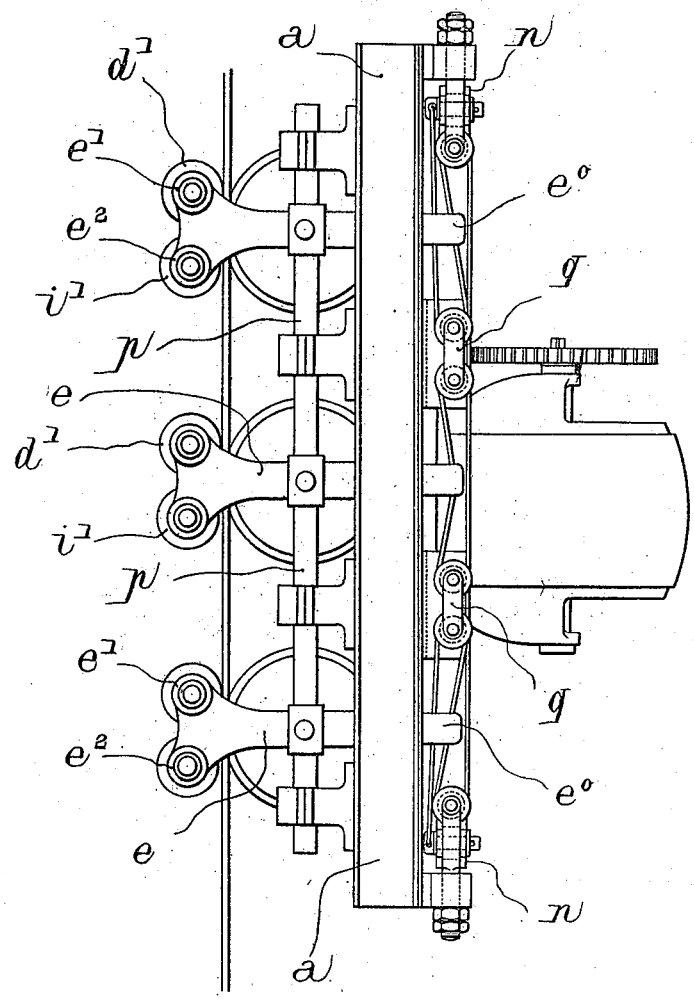

LOUIS JOSEPH JEAN BAPTISTE CHÊNEAU, OF PARIS, FRANCE.

RAIL MOTOR-CAR.

1,250,797.

Specification of Letters Patent.

Patented Dec. 18, 1917.

Application filed July 9, 1914. Serial No. 850,040.

*To all whom it may concern:*

Be it known that I, LOUIS JOSEPH JEAN BAPTISTE CHÊNEAU, engineer, a citizen of the French Republic, residing at Paris, 35 Rue St. Georges, France, have invented certain new and useful Improvements in Rail Motor-Cars, of which the following is a specification.

This invention relates to rail motor cars and has for its main object to construct in such a manner, the rail motor cars that may be able to run on a smooth track regardless the inclination of the said track.

The invention consists mainly in providing the rail motor cars with means insuring their adhesion on the rails in consequence of a wedging action produced by the weight of the said cars.

It consists further in using, for constituting the said means, levers hinged to the said cars and provided with rollers bearing on the lower face of one of the rails, on the upper face of which the wheels of the car bear, or on another rail.

It consists also in providing cars, having several driving axles, with means connecting the levers corresponding to the said axles in such a manner that the resisting effort be suitably distributed on the said axles.

The invention consists also in some other features of construction, arrangement and combination of parts which will be clearly set out hereinafter.

The invention will be more clearly understood with the aid of the following description and of the accompanying drawings which are merely given by way of example.

The Figures 1 and 2 show respectively in elevation and in transverse section taken on line 2—2 of Fig. 1 a rail motor car constructed according to the invention.

The Fig. 3 shows in the same manner as Fig. 2 a modification of the said rail motor car constructed according to the invention.

The Figs. 4 and 5 show respectively in elevation and in longitudinal section a second rail motor car constructed according to the invention.

The Fig. 6 shows in longitudinal section a third rail motor car constructed according to the invention.

The Fig. 7 shows in front elevation a fourth rail motor car constructed according to the invention.

The Fig. 8 shows a vertical section of a part of a fifth rail motor constructed according to the invention.

Figure 10:
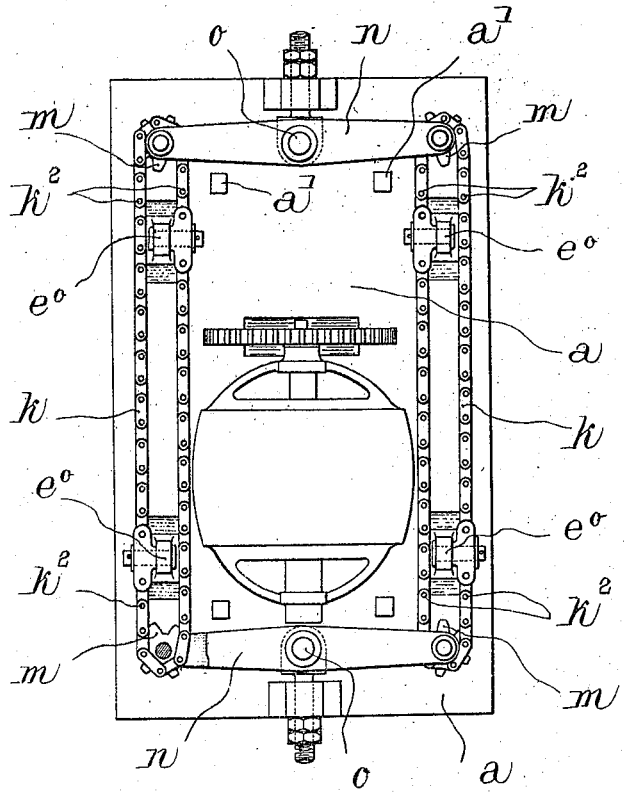
Figure 11:
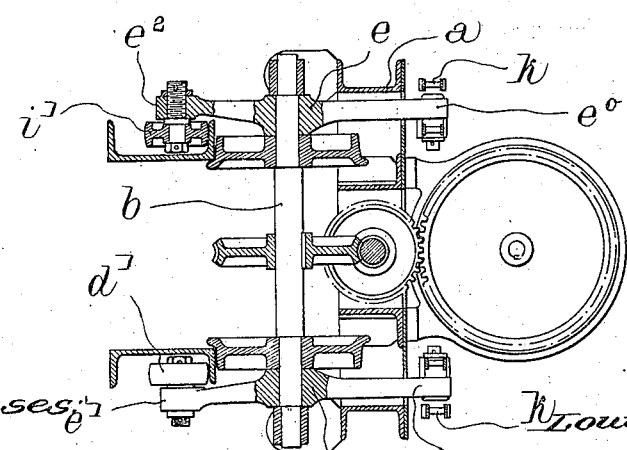

The Figs. 9, 10 and 11 show respectively in half elevation and half section with parts broken away, in plane, and in section according to the line 11—11 (Fig. 9) a sixth rail motor car constructed according to the invention.

The Fig. 12 shows, in the same manner, but diagrammatically as Fig. 10 the same car, with some of its parts in another position than that one shown in Fig. 10.

The Figs. 13 and 14 show respectively in front elevation and in section a part of another car constructed according to the invention.

The Figs. 15 and 16 finally show respectively in front elevation and in plane other cars established according to the invention.

In the drawings and in the following description it has been supposed that the rail motor car runs on a rail-way track constituted with two traction rails.

The car comprises a frame $a$ on which is mounted the motor; the said frame is provided, as shown in Figs. 1 to 8, for instance with two axles $b$, $c$; one of the said axles, the rear axle $b$ carrying for instance the driving wheels $b^1$ while the other axle $c$ carries the free wheels $c^1$.

The frame $a$ is further provided with means wedging the car on the rail, the said means being preferably constituted by rollers $d^1$ mounted on an axle $d$ connected to the said frame $a$. The said axle $d$ is mounted in front of the driving wheels $b^1$. The rollers $d^1$ bear either, as shown in Figs. 1 and 2, on the lower face of the rails on the upper face of which the wheels $b^1$ and $c^1$ bear, or, as shown in Fig. 3 on rails being independent from the rails of the track.

If the various parts of such a car have been suitably determined, the said car will be able either to remain motionless on a smooth vertical track or to ascend in running on such a vertical track; consequently it will be also able to remain motionless or to ascend in running on a smooth track whatever may be the inclination of such a track.

Consider for instance a smooth vertical track A A¹ (Fig. 1) and consider also a motor car in which: G is the center of gravity of the said motor car; P its weight; $l$ the distance between the center G and the track; N the resultant of the reactions of the track on the driving wheels $b^1$; $N^1$ the resultant of the reactions of the track on the rollers $d^1$; $f$ the coefficient of rolling friction of the wheels $b^1$ and of the rollers $d^1$ on the rails; $l^0$ the distance between the axle of the rollers $d^1$ and the axle of the driving wheels $b^1$; $P^1$ the weight of the vehicles dragged by the said motor car; $l^1$ the distance between the draw-hook of the said car and the track.

In order that the car may remain motionless or ascend on the track at a constant speed, it is necessary and sufficient that the algebraical sum of the projections of the forces applied to the motor car on two axes which are in the plane of the said forces (for instance on the longitudinal axis of the track and on an axis which is perpendicular to the said axis) and the algebraical sum of the momentum of the said forces with respect to a point of the said plane (for instance the middle point B of the line connecting the contact points of the rollers $d^1$ with the track) be null; and consequently that the three following equations are obtained:

$$P+P^1 = fN + fN^1$$
$$N = N^1$$
$$Nl^0 = Pl + P^1 l^1$$

which may be reduced to the two following equations $$P+P^1 = 2fN \quad (1)$$
$$Pl + P^1 l^1 = Nl^0. \quad (2)$$

In the case where the draw-hook is at the same distance from the track that the center of gravity, $$l = l^1$$

and the equations become:

$$P+P^1 = 2fN \quad (3)$$
$$(P+P^1)l = Nl^0 \quad (4)$$

or $$l = \frac{l^0}{2f}.$$

This last equation gives a condition which is independent from the weight of the motor car and of its train of vehicles.

In order to increase the adhesion the car is preferably constructed in such a manner that the value of $l$ be lower than $\frac{l^0}{2f}$.

When the motor descends, and runs forward along the track, the weight of the car and the train of vehicles has no greater tendency to press the driving wheels of the car against the rails of the track than it has to remove the wheels from the said rails, since means are provided for exerting a braking action in order to prevent the vehicles from running away, as will be apparent from the following description.

Advantageously the following features may also be used:

The frame $a$ may be provided with guides $a^0$ as shown in Fig. 4 which allow the axle $b$ to be longitudinally displaced.

The car may also be provided, as shown in Figs. 4 and 6, with two bent levers $e$ which are hinged to the axle $b$ and are formed with two arms $e^0$, $e^1$; the rollers $d^1$ are then mounted loose on pins fixed to the end of the arms $e^1$, and the motor car is provided with means obliging the said levers $e$ to support the weight of the car and of its dragged vehicles. The said means are, for instance, constituted by two abutments mounted on each side of the arm $e^0$ of the levers or, as shown in Figs. 4 and 6, by a pin $g$ engaged in a hole provided near the end of the said arms $e^0$. Consequently the weight of the motor car and of its dragged vehicles being applied at the end of the arms $e^0$ will press constantly on the rails the wheels $b^1$ and the rollers $d^1$, whatever may be the form of the track.

The wheels $b^1$ may be fixed on their axle $b$, and the said axle $b$ may be then set into rotation, as shown in Fig. 6, by means of a worm $h$ mounted on the motor shaft and of a worm wheel $b^2$.

With such a feature, as the driving by means of worm and worm wheel is not a reversible one, the axle $b$ can no more rotate if the motor stops and consequently the car remains motionless. Furthermore the axle $b$ may be displaced longitudinally with respect to the frame $a$, as the worm wheel $b^2$ is able to roll on the worm $h$ in the same manner as a toothed wheel rolls on a rack.

The levers $e$ may be advantageously provided with a third arm $e^2$ disposed symmetrically to the arm $e^1$ with respect to a plane perpendicular to the track and passing through the axis of the axle $b$. The end of the said arms $e^2$ carries rollers $i^1$ disposed symmetrically to the rollers $D^1$ with respect to the same plane. The said rollers $i^1$ act, when the car descends, in the same manner as the rollers $d^1$ when the car ascends; and they allow, consequently the braking means to be dispensed with.

Straight levers $j$ could be substituted for the bent levers $e$, as shown in Fig. 7. Each one of the said straight levers will then carry at its end a roller $d^1$ which will produce a wedging action as well when the car is ascending along the track as when it is descending along the said track.

The levers $e$ could also be connected at their upper end by means of a cross bar $e^3$ provided with an arm $e^{30}$ perpendicular to the cross bar. The weight of the motor car and of its dragged vehicles is then applied on the said arm $e^{30}$ either, as shown on Fig. 8, by means of a cross bar passing through a hole provided in the said arm, or by means of two abutments fixed to the car on each side of the said arm.

If the rear wheels are the driving wheels, the draw-hook is fixed at the lower part of the car, and the buffer at the upper part of the said car; and if the front wheels are the driving wheels, the draw-hook is fixed at the upper part and the buffers at the lower part of the car, in order that the weight of the dragged vehicles acts always, as well when ascending as when descending along the track, to press the driving wheels of the motor car against the rails.

The motor car could also be provided with several driving axles $b$, for instance two driving axles as shown in Figs. 9 to 16.

The said axles are then mounted in such a manner that they can be displaced longitudinally with respect to the frame $a$.

On each one of the said axles $b$ two levers $e$ are hinged. The said levers are constituted in the same manner as those hereinbefore described, with three arms $e^0$, $e^1$, $e^2$; the arms $e^1$ and $e^2$ being symmetrically disposed with respect to a plane perpendicular to the track and passing through the axis of the axle $b$. The end of the arms $e^1$ and $e^2$ carries also rollers $d^1$ and $i^1$.

Furthermore the two levers $e$ which are mounted on the same side of the car are connected to an endless chain $k$ mounted on two chain wheels $m$. The said chain wheels are mounted respectively at the corresponding ends of levers $n$ rotatably mounted on axis $o$. The axis $o$ for the said levers $n$ are fixed at both ends of the frame $a$ in the longitudinal plane of symmetry of the said frame.

When the motor car is on a vertical or inclined track, its weight as well as the weight of its dragged vehicles acts through the levers $n$ and the chains $k$ on the arms $e^0$ of the levers $e$. The said levers $e$ have then tendency to turn around their pivot $b$ and press the wheels $b^1$ as well as the rollers $d^1$ against both faces of the track, wedging thus the motor car on the track.

As the levers $e$ which are mounted on the same side of the car are connected by means of the corresponding chain $k$, the resisting effort is equally distributed between the said levers and consequently between the driving axles.

If the longitudinal section of the track is a curved one, the two levers on the same side of the cars being obliged to converge toward the center of the curve, are inclined the one toward the other, and this movement is rendered more easy by the chain which connects them.

If an unevenness of the track causes one only of the levers to oscillate, as shown in Fig. 12, the point A of the chain to which is fixed the said lever being brought at $A^1$ the said lever exerts a traction on the part $k^1$ of the chain, but the point B to which is attached the other lever $e$ remains motionless and the chain wheels on which are mounted the said chains are displaced by a quantity equal to $$\frac{AA^1}{2};$$

the chain wheels of the other chain remain motionless and the axis $o$ as well as the frame on which they are fixed are displaced of a quantity equal to $$\frac{AA^1}{4}.$$

Such a motor car with two driving axles has a greater stability on the track than those with one driving axle; the stresses on the parts insuring the sustentation and the adhesion are reduced; the security is greater. Advantageously the axle boxes of the axles $b$ are connected by means of bars $p$ or the like which oblige the distance between the said axles to remain always the same.

The frame $a$ could be provided also as shown in Fig. 12 with abutments $a^1$ which limit the movement of rotation of the levers $n$ which would be produced if one of the chains $k$ be broken.

The chains $k$ could also be provided with abutments $k^2$ (Fig. 12) which have for their object to bear on the levers $n$ if their corresponding chain is broken.

The adhesion could be increased by using, as rollers $d^1$ and $i^1$, driving rollers which are set for instance into rotation through a suitable gearing by means of the axles $b$, as shown in Figs. 13 and 14.

It is obvious that an endless rope mounted on rollers could be substituted for the chains.

Instead of endless chains or ropes, chains or ropes passing on a tackle $q$ as shown in Fig. 15 and having their ends fixed to the levers $n$ could be used.

The levers $n$ could also be directly fixed to the levers $e$ as shown in Fig. 16. Then the said levers $n$ are connected together by means of connecting rods $r$ hinged respectively to the middle of the said levers $n$ and to the ends of a lever $s$ pivoted on an axis $t$ fixed to the frame $a$.

It is understood that the invention is not in any way limited to the dispositions which have been hereinbefore described but that it comprises also all the modifications which are comprised in the scope of the claims.

Having now particularly described and ascertained the nature of my invention, and in what manner the same may be performed, I declare that what I claim is.

1. A rail motor car provided with levers pivoted on the driving axles of the car and having two arms symmetrically disposed with respect to a plane perpendicular to the track and passing through the axis of the driving axle, rollers symmetrically disposed with respect to the same plane being mounted at the end of the said arms and bearing on the lower face of rails of the track.

2. A rail motor car provided with levers pivoted on the driving axles and carrying the rollers bearing on the lower face of rails of the track, and means for obliging the said levers to support the weight of the car and of its dragged vehicles.

3. A rail motor car provided with levers pivoted on the driving axles and carrying the rollers bearing on the lower face of rails of the track, a pin fixed to the frame of the car and passing through holes of the said levers.

4. A rail motor car provided with rollers bearing on the lower face of rails of the track while the wheels of the said car bear on the upper part of rails of the said track, the driving axles of the said car being mounted in such a manner that they may be displaced longitudinally.

5. A rail motor car provided with rollers bearing on the lower face of rails of the track while the wheels of the said car bear on the upper part of rails of the said track, the driving wheels being fixed to the driving axles which are set in rotation by means of a worm and a worm wheel.

6. A rail motor car having several driving axles and levers pivoted on the said driving axles and carrying the rollers bearing on the lower face of rails of the track, and means for distributing the resisting effort on the said axles.

7. A rail motor car having two driving axles, levers pivoted on the said driving axles and carrying the rollers bearing on the lower face of rails of the track, a chain connecting the levers mounted on the same side of the car, levers pivoted at the ends of the frame of the car and carrying chain wheels on which the said chains pass.

8. A rail motor car having two driving axles, levers pivoted on the said driving axles and carrying the rollers bearing on the lower face of rails of the track, a chain connecting the levers mounted on the same side of the car levers pivoted at the ends of the frame of the car and carrying chain wheels on which the said chains pass and abutments preventing the rotation of the levers pivoted at the ends of the frame if a chain is broken.

9. A rail motor car having two driving axles, levers pivoted on the said driving axles and carrying the rollers bearing on the lower face of rails of the track, a chain connecting the levers mounted on the same side of the car levers pivoted at the ends of the frame of the car and carrying chain wheels on which the said chains pass and abutments fixed to the chains which bear on the levers pivoted at the ends of the frame if a chain is broken.

10. A rail motor car having several driving axles and levers pivoted on the said driving axles and carrying the rollers bearing on the lower face of rails of the track, and means for distributing the resisting effort on the said axles and means connecting the driving axles for maintaining them at a constant distance.

In testimony whereof I have hereunto set my hand in presence of two subscribing witnesses.

LOUIS JOSEPH JEAN BAPTISTE CHÊNEAU.

Witnesses:
   CHAS. P. PRESSLY,
   PAUL BLUM.

Copies of this patent may be obtained for five cents each, by addressing the "Commissioner of Patents, Washington, D. C."